H. TIDEMAN.
TELEPHONE HOOK SWITCH.
APPLICATION FILED JULY 6, 1907.
901,213.
Patented Oct. 13, 1908.
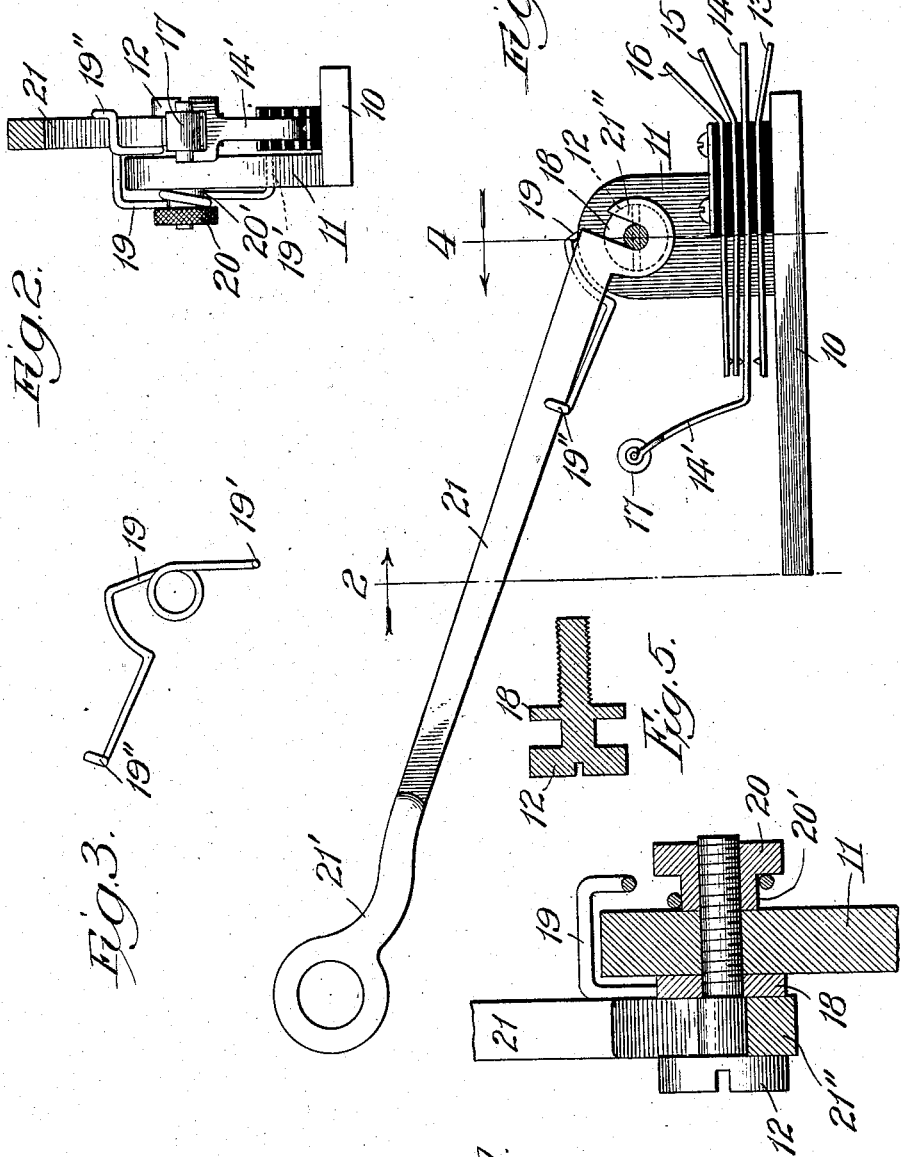
Witnesses:
Inventor:
Henry Tideman.

UNITED STATES PATENT OFFICE.

HENRY TIDEMAN, OF MENOMINEE, MICHIGAN.

TELEPHONE HOOK-SWITCH.

No. 901,213.  Specification of Letters Patent.  Patented Oct. 13, 1908.

Application filed July 6, 1907. Serial No. 382,427.

*To all whom it may concern:*

Be it known that I, HENRY TIDEMAN, a citizen of the United States of America, and a resident of Menominee, county of Menominee, and State of Michigan, have invented a new and useful Improvement in Telephone Hook-Switches, of which the following is a specification.

My invention pertains to the manufacture of parts for use in the assembly of complete telephone subscriber's equipments, and provides an improved type of gravity switch or hook switch to be operated when the subscriber hangs up his receiver in a manner well known.

I provide a readily removable switch operating hook lever, a set of springs having a long spring designed to engage the hook lever in a simple manner, a spring for actuating the hook lever, and a mounting base whereon these various parts are conveniently grouped.

This specification is accompanied by a sheet of drawings containing five figures in which Figure 1 shows an elevation of the complete hook switch device, the pivot screw of the device being sectioned with the head thereof shown dotted. Fig. 2 is an end view of the same, with the hook lever sectioned on the line 2 of Fig. 1. Fig. 3 is a detail of the lever actuating spring of the device. Fig. 4 is a sectional view on the line 4 of Fig. 1. Fig. 5 shows in section a modification of the pivot screw.

The rigid base 10 has an integral vertical lug 11 drilled and threaded to receive the supporting pivot screw 12. The pivot screw 12 has the annular collar or washer 18 placed upon it as a drive fit; the collar 18 thus becomes rigid with the screw 12 and may be integral therewith, as shown in section in Fig. 5. After the pivot screw 12 with its shoulder 18 has been screwed into the vertical lug 11, the lever actuating spring 19 is placed around it and the lock nut 20 is screwed in place. The lock nut 20 is shouldered at 20' and serves three purposes as follows:—first, it is a lock nut for the pivot screw 12; second, it provides a smooth cylindrical surface at 20' for receiving and supporting the coil portion of the spring 19, and, third, it provides an overhanging head, retaining the spring 19 in position upon the shoulder portion 20'. The spring 19 surrounds the nut 20 loosely, one end 19' of the spring 19 being rigidly held within a hole drilled into the lug 11, as shown in Fig. 2; the other end 19'' of the spring 19 engages the hook lever. The hook lever 21 is provided at its end 21' with the usual double prong hook for holding the telephone receiver. At the other end it is formed into a hook at 21'', adapted to engage the body portion of the pivot screw 12 between the head of that screw and its shoulder 18, the open side of the hook at 21'' extending in such direction that the tension of the spring 19 tends to hold the hook lever 21 in engagement with the pivot screw 12. Upon the base 10 is mounted the group of switch springs 13—14—15—16, the spring 14 being extended at 14' and carrying insulating roller 17, upon which roller the hook lever presses to operate the switch springs.

Having thus described my invention, what I claim as new and desire to secure by United States Letters Patent is:

In a telephone hook switch, a base having a vertical lug, a pivot screw in said lug, a lock nut for said pivot screw having a section of reduced diameter in that portion of the lock nut adjacent to said lug, a hook lever, and a hook lever tension spring, said tension spring being supported and retained by and upon said lock nut in its portion of reduced diameter, substantially as described.

Signed by me at Menominee, county of Menominee and State of Michigan, in the presence of two witnesses.

HENRY TIDEMAN.

Witnesses:
  LEOPOLD JACKMAN,
  F. J. DONOVAN.